United States Patent [19]
Moharram

[11] Patent Number: 5,825,860
[45] Date of Patent: Oct. 20, 1998

[54] LOAD SHARING GROUP OF SERVICE CONTROL POINTS CONNECTED TO A MEDIATION POINT FOR TRAFFIC MANAGEMENT CONTROL

[75] Inventor: Omayma El-Sayed Moharram, Cavleton Place, Canada

[73] Assignee: Northern Telecom Limited, Montreal, Canada

[21] Appl. No.: 815,260

[22] Filed: Mar. 12, 1997

[51] Int. Cl.$^6$ .................................................. H04M 15/00
[52] U.S. Cl. ...................... 379/133; 379/115; 379/207; 379/219; 379/229
[58] Field of Search .................................... 379/111, 112, 379/113, 115, 133, 134, 207, 211, 212, 219, 220, 221, 229, 230, 242, 137, 138

[56] References Cited

U.S. PATENT DOCUMENTS

| | | | |
|---|---|---|---|
| 5,042,064 | 8/1991 | Chung et al. | 379/113 |
| 5,438,568 | 8/1995 | Weisser, Jr. | 370/60 |
| 5,539,815 | 7/1996 | Samba | 379/113 |
| 5,570,410 | 10/1996 | Hooshiari | 379/32 |
| 5,581,610 | 12/1996 | Hooshiari | 379/134 |
| 5,701,301 | 12/1997 | Weisser, Jr. | 370/428 |

FOREIGN PATENT DOCUMENTS

| | | | |
|---|---|---|---|
| 0 687 096 A | 12/1995 | European Pat. Off. | H04M 3/50 |
| 0 735 786 A2 | 10/1996 | European Pat. Off. | H04Q 3/66 |
| 195 38 804 A1 | 5/1996 | Germany | H04M 3/36 |

OTHER PUBLICATIONS

Heinmiller W. et al: "Solutions For Mediated Access To The Intelligent Network", ISS '95. World Telecommunications Congress. (International Switchin Symposium), Advanced Switching Technologies For Universal Telecommunications At the Beginning Of the 21$^{st}$ Centruy Berlin, Apr. 23–28, 1995, vol. 2, No. Symp. 15, 23 Apr. 1995, Verband Deutscher Elektrotechniker (VDE) et al, pp. 217–221, XP000495656.

Koerner U et al: "Overload Control In Communications Networks", Countdown To The New Milennium, Phoenix, Dec. 2–5, 1991, vol. 2, No.–, 2 Dec. 1991, Institute Of Electrical And Electronics Engineers, pp. 1331–1335, XP000332869, see p. 1334, right–hand column, line 47– p. 1335, left–hand column, line 13, see p. 1334; figure 7.

Bray, M: "Impact Of New Services On SCP Performance", International Conference On Communications, Including Supercomm Technical Sessions. Atlanta, Apr. 15–19, 1990, vol. 1, No. –, 15 Apr. 1990, Institute Of Electrical And Electronics Engineers, pp. 241–247, XP000147409, see p. 244, right–hand column, line 1—p. 246, left–hand column, line 26, see figure 4.

*Primary Examiner*—Curtis A. Kuntz
*Assistant Examiner*—Binh K. Tieu
*Attorney, Agent, or Firm*—John A. Granchelli; Dallas F. Smith

[57] ABSTRACT

In the Intelligent Networks environment, where multiple Service Providers and multi-Vendor equipment are involved in new service offering, the risk of overloading the network elements are real and managing the traffic is a challenge. Network traffic overloads could result from equipment failures, major equipment outages, or widespread loads above engineered levels. To solve the problem of network traffic overload, a Mediation Point (MP) is connected to a group of service control points (SCP). The MP includes control feature to balance the load and manage the overload controls for the multiple SCPs that are deployed in load sharing mode in the network.

16 Claims, 8 Drawing Sheets

PRIOR ART

MP SSC AND SSA MESSAGES ENCODING FORMAT

| SIZE | BITS | | | | | | | |
|---|---|---|---|---|---|---|---|---|
| | 8 | 7 | 6 | 5 | 4 | 3 | 2 | 1 |
| 1 OCTET | MESSAGE TYPE IND | | | | | | | |
| 1 OCTET | SPARES | | | LENGTH INDICATOR (LI) | | | | |
| 1 OCTET | SCP SUBSYSTEM NUMBER (SSN) | | | | | | | |
| 1 OCTET | SCP MACHINE CONGESTION LEVEL 1 (SCP_MC1) | | | | | | | |
| 1 OCTET | SCP MACHINE CONGESTION LEVEL 2 (SCP_MC2) | | | | | | | |
| 1 OCTET | SCP MACHINE CONGESTION LEVEL 3 (SCP_MC3) | | | | | | | |
| 3 OCTETS | ORIGINATING SCP ADDRESS (O_SCP_ADDRESS) | | | | | | | |
| 3 OCTETS | MEDIATION POINT CODE (MPPC) | | | | | | | |
| 8 OCTETS | GLOBAL TITLE ADDRESS/TRANSLATION TYPE (GTA/TT) | | | | | | | |
| 3 OCTETS | SCP MACHINE CONGESTION TIME (SCP_MC_TIME) SEE FIG. 8 | | | | | | | |
| 1 OCTET | ADDITIONAL INFORMATION | | | | | | | |

FIG. 7

SCP MACHINE CONGESTION TIME

| | 8 | 7 | 6 | 5 | 4 | 3 | 2 | 1 |
|---|---|---|---|---|---|---|---|---|
| 1 OCTET | NULL IND | | MONTH | | | | YEAR | |
| 1 OCTET | SPARE | | | DATE | | | | |
| 1 OCTET | SPARE | MINUTE | | | HOUR | | | |

LOAD SHARING GROUP OF SERVICE CONTROL POINTS CONNECTED TO A MEDIATION POINT FOR TRAFFIC MANAGEMENT CONTROL

RELATED APPLICATION

This application is related to copending U.S. patent application Ser. No. (case No. MOHARRAM 3), entitled "Communications Link Interconnecting Service Control Points Of A Load Sharing Group For Traffic Management Control", which was filed concurrently herewith and is incorporated herein by reference.

BACKGROUND OF THE INVENTION

This invention relates generally to Intelligent Networks for telecommunications and, in particular, to load sharing between a group of Service Control Points for traffic management control within the network.

Figure 1:
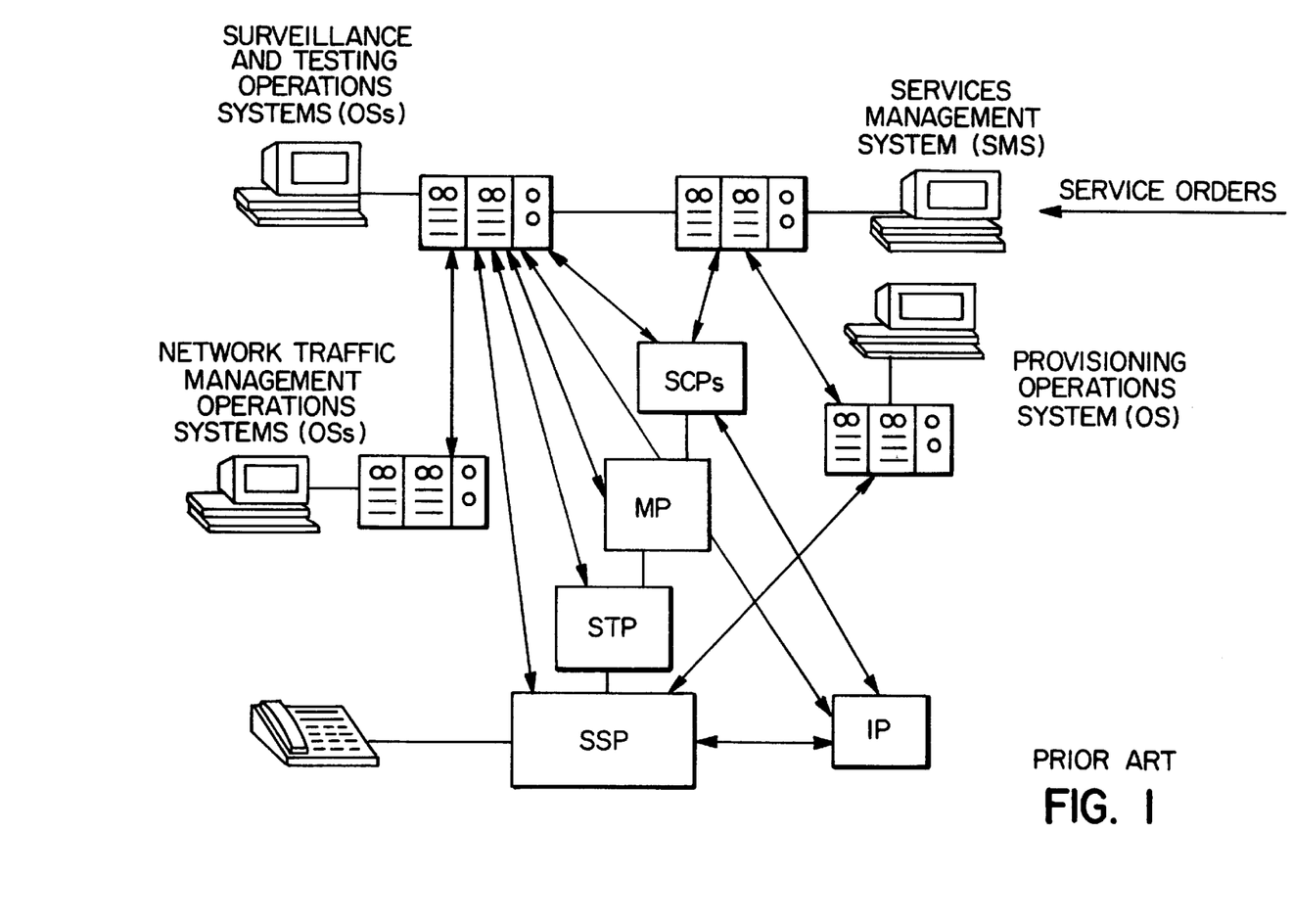
FIG. 1 is a schematic illustrating a typical IN with an Operations, Administration and Maintenance management environment.

With reference to FIG. 1, as is well known, an Intelligent Network (IN) includes various network elements (NEs), such as, Service Switching Points (SSPs), Service Control Points (SCPs), Adjuncts, Intelligent Peripherals (IPs), and Mediation Points (MPs). The IN service offering implies cooperation between different network elements, typically the SSPs and SCPs, using the Common Channel Signaling No. 7 (CCS7) network protocols.

An Operations, Administration, and Maintenance (OAM) management environment is characterized by functionality to ensure reliable operation of the IN. Telecommunication Management Network (TMN) components providing the network OAM management include a Services Management System (SMS), Surveillance and Testing Operations Systems, and Network Traffic Management (NTM) Operations Systems (OSs). Measurements, logs and alarms related to network operations and services are generated by the NEs and collected by the OSs for OAM management. The Surveillance and Testing Operations Systems (OSs) provide fault management. The main objective of the Network Traffic Management OSs is to manage overload controls at the various NEs and to ensure service reliability and network integrity.

The NTM consists of monitoring and control functions aimed at the detection of abnormal load conditions and excessive traffic congestion, activation, de-activation and monitoring of overload controls. The IN NTM requirements in [1] GR-1298-CORE, Advanced Intelligent Network (AIN) Switching Systems Generic Requirements, Bellcore, Issue 3, July, 1996; [2] Draft Revised ITU-T Recommendation Q.1218, Interface Recommendation for Intelligent Network CS-1. COM 11-R 104E, May 1995; and [3] ITU-T Recommendation E.412, Telephone Network and ISDN Quality of Service, Network Management and traffic Engineering, Network Management Controls, emphasize the need for automatic call-associated query and non-call-associated signaling messages limiting controls triggered by detected congestion conditions at one or more connected equipment. These controls minimize congestion conditions, due to traffic overloads (or reduced call processing capacity) at the NE, from spreading to the subtending NEs and throughout the rest of the network.

Automatic Code Gapping (ACG) is a network management mechanism used in the control of network congestion. For example, if an SCP becomes congested with queries, it can issue a request to slow down or stop a SSP from sending queries for a predetermined period. When an SCP finds that it is being overloaded with queries, it automatically issues a request that the SSP slow down or stop sending queries, matching a certain criterion or criteria, for a given duration of time. The criteria and the request can also be manually initiated from the service management system (SMS). Both automatic- and manually-initiated requests are relayed from the SCP to the SSP in the form of an ACG message. From the SCP/SMS initiated ACG request messages, a list of controls is created and maintained against which pending SCP destined queries are checked. During call processing, prior to sending an IN query, the ACG controls are checked to determine whether the query is to be gapped (that is, blocked). If the criteria specified in the control matches that for the pending query, then the query is gapped, and either IN final treatment or Default Routing is applied to the call.

Implementation of the Automatic Code Gapping (ACG) mechanism consists of procedures in the SCPs for detecting and identifying the congestion level at the SCP, messages for communicating the SCP congestion level back to the SSPs, and procedures in the SSPs for throttling back the traffic. The ACG controls are all based on indirect routing of SCP queries. A traffic control item is identified by its Global Title Address (GTA) and Translation Type (TT), which are converted at the Signaling Transfer Point (STP) to the signaling point code of the destination SCP and SubSystem number (SSN) of the particular application or application set at that SCP. An ACG request to a SSP tells it to regulate sending the traffic using specific gap interval and duration. The ACG control can be initiated from the SCP in two ways: (1) automatically via SCP initiated code control; and (2) manually via the SMS Originated Code Control (SOCC). The manual SOCC method complements the automatic SCP method.

Having regard to the automatic SCP controls, when the SSP receives an ACG message with a control cause indicator of "SCP Overload", it places the TT and 6-digit GTA on the SCP overload controls list. Timers for both gap interval and duration are started by the SSP when the control is added. Subsequent calls being processed by the SSP that generate queries with a called or charged number, matching the 6 digit code for the given TT are gapped until a period of time equal to the gap interval expires. After the gap interval expires the SSP allows the next applicable query to proceed normally. After this query has been sent, the SSP resumes blocking for another period of time equal to the gap interval. This cycle continues until a period of time equal to the duration has passed. The SCP overload control is removed from the controls list when the duration expires.

For the manual SOCC controls, when the SSP receives an ACG message with Control Cause Indicator of "SMS Originated", it places the "TT and 3-, 6-, 7-, 8-, 9-, or 10-digit GTA" control on the SOCC controls list. Timers for both gap interval and duration start when that control is added. After the control with a TT and GTA is added to the SOCC controls list and the gap interval timer has been started, calls which generate queries with "called or charged number+TT" matching the GTA+TT in the SOCC controls list are gapped until the gap interval expires. After the gap interval expires, the SSP allows the next applicable query to proceed normally. After this query has been sent, the SSP resumes blocking for another period of time equal to the gap interval. This cycle continues until a period of time equal to the duration has passed. The control is removed from the SOCC controls list when the duration expires.

Figure 2:
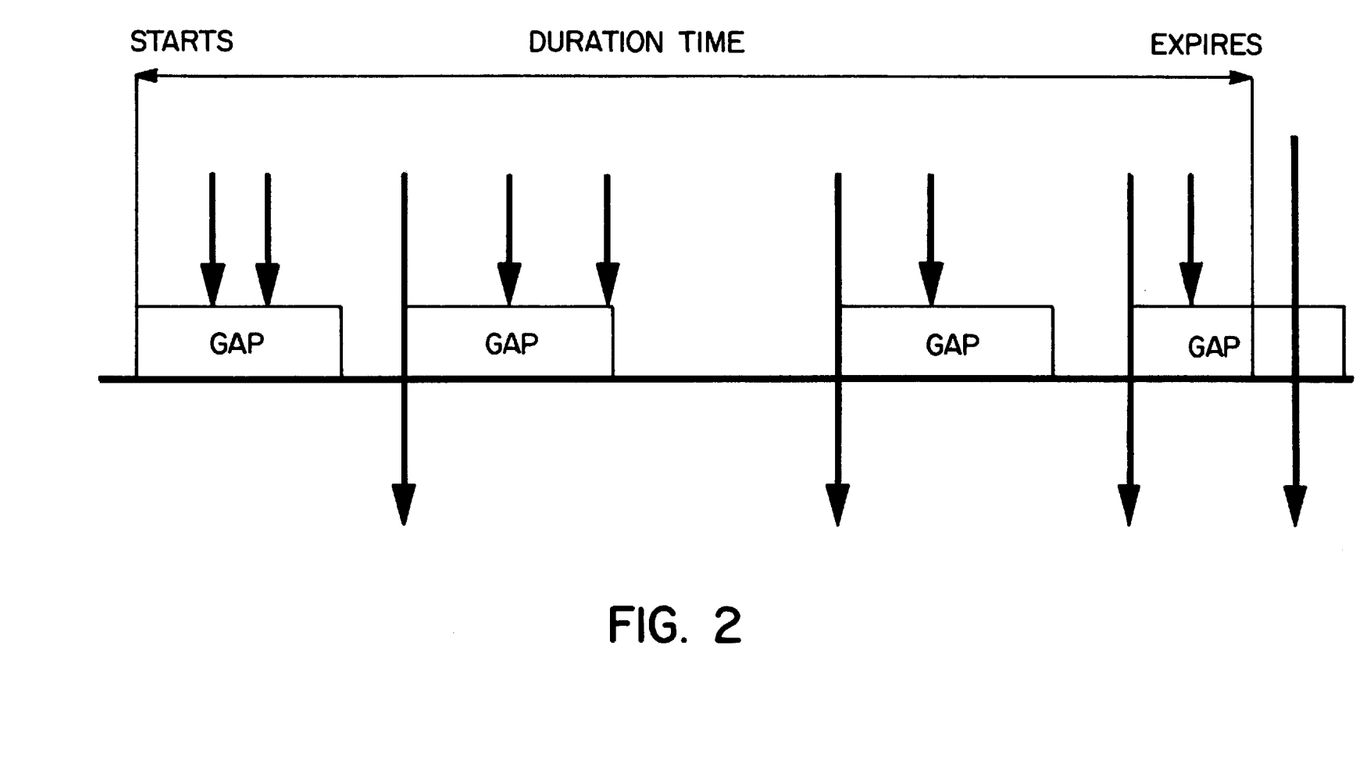
FIG. 2 is a timing graph illustrating a definition of code gapping for network congestion control.

Code gapping is a form of rate control. The SSP uses code gapping to regulate the queries destined to the SCP. Code gapping limits the number of initial queries per second, which is exemplified in FIG. 2. The arrows represent time when queries would normally be sent from the SSP to the SCP. When gapping is initiated, all queries from the source are blocked during the first gap interval, after which the next query may pass. Once a query passes, then all queries are blocked for the following gap. At most one query per gap interval will pass. This pattern repeats until the duration timer expires or the call gapping is de-activated.

Figure 3:
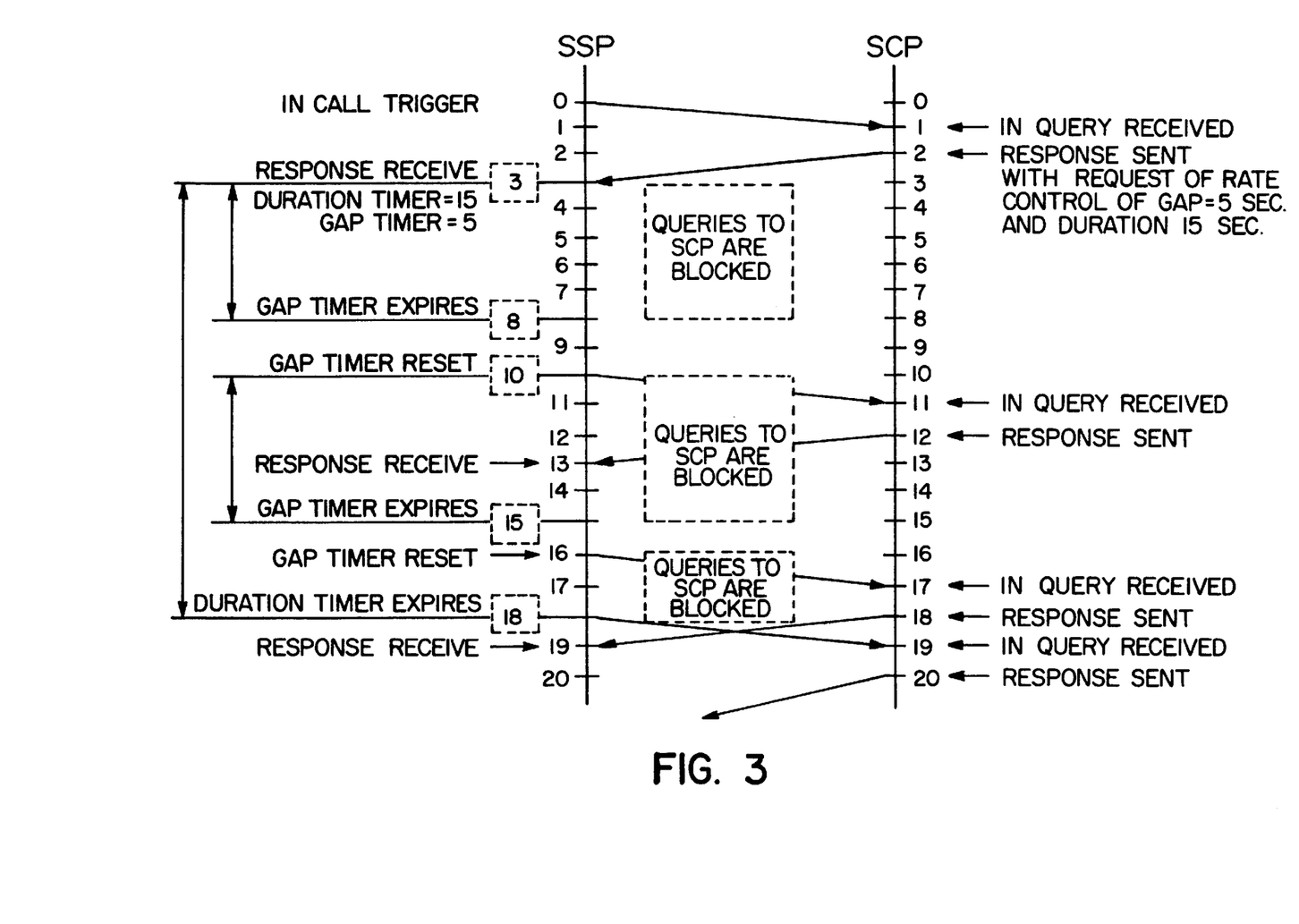
FIG. 3 is a timing graph illustrating an example of code gapping in operation.

FIG. 3 illustrates by way of example operation of code gapping control, wherein a duration of 15 seconds and gap interval of 5 seconds is employed. As shown in the figure, when the SSP receives an ACG request from an overloaded SCP, it initializes a duration timer and a gap timer. From 3 to 8 seconds, queries to the SCP are blocked (that is, no queries are sent to the SCP). When the gap timer expires, the next query is sent to the SCP. When the SSP sends a query to the SCP, it resets the gap timer (as shown at the 16th second), and the SCP processes the query and checks to see if the control should stay active. The SSP blocks queries from the 16 to 18 seconds, after which the duration timer expires. From the 18 seconds onward, queries are sent to SCP.

A potential problem with conventional code gapping may be an unfair throttling of SSP traffic. The SSP uses a gap interval and duration to regulate queries to the SCP and sends excess queries to reorder tone or announcement. When gapping is initiated, all queries from the SSP are blocked during the first gap interval, after which the next query may pass. Once a query passes then all queries are blocked for the following gap interval. Thus at most one query per gap interval will pass. The pattern of one query accepted followed by an interval in which all are blocked repeats until a duration timer expires. In this mechanism the same gap interval and duration are applied to all SSP offices. The control throttles large office much more severely than small offices. This results in unfair treatment between large and small offices. The control alternatingly turns traffic on and off, and the off period may be too long. Further, large offices can be expected to throttle a higher percentage of traffic than smaller offices. This mechanism does not take the SSP office size into consideration.

Figure 4:
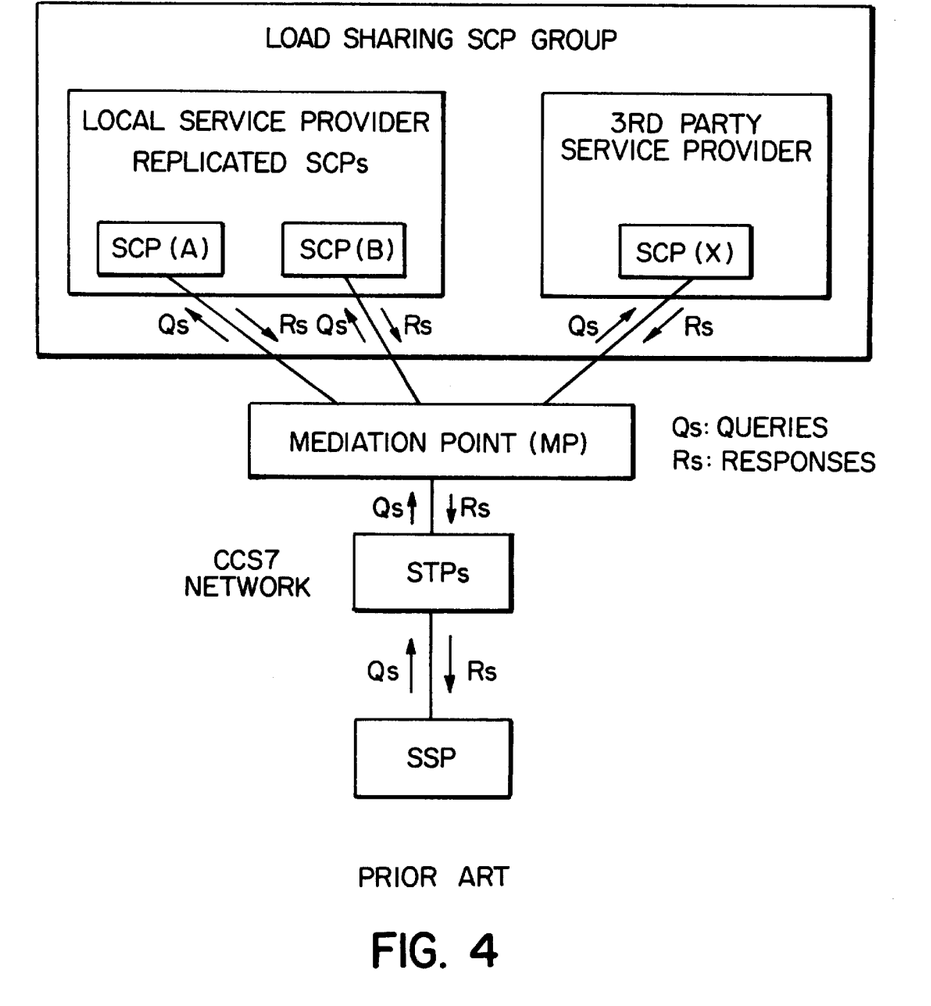
FIG. 4 is a schematic illustrating a prior art load sharing SCP group operations environment.

Another deficiency of conventional code gapping may be poor SCP resource utilization in conection with a load sharing SCP group. Operating companies replicate services on multiple SCPs for load sharing and reliability. An illustration of replicated SCPs (or Load Sharing SCPs) deployment is shown in FIG. 4, which includes a Mediation Point (MP) that controls message traffic to each of the SCPs forming part of the load sharing group. An example of the MP is presented in U.S. Pat. No. 5,438,568, issued on Aug. 1, 1994 to F. J. Weisser, which teaches a method of mediating message traffic across interfaces open to third party Service Providers.

If one SCP in the load sharing SCP group is overloaded, it tells the SSPs to regulate the traffic destined to it. Since the SSPs view the load sharing SCP group as a single entity and the traffic control item is identified by its Global Title Address (GTA) and Translation Type (TT), the SSP applies the control to all calls that generate queries with matching GTA/TT. For example, if one of the multiple SCPs, say SCP-A, in a load sharing SCP group sends an overload control request to the SSP, all calls which match the GTA/TT under control will be blocked by the SSP even if the other SCPs in the group, namely SCP-B and SCP-X could process those queries. This results in poor SCPs resources utilization.

Yet another problem may be control instability. If SCP-B is not overloaded, it will request the SSP to remove the control. This results in control request and removal messages exchanges between the SSP and the load sharing SCP group. Excessive messages between the SSPs and load sharing SCP group may result in network traffic congestion and network performance degradation.

Figure 5:
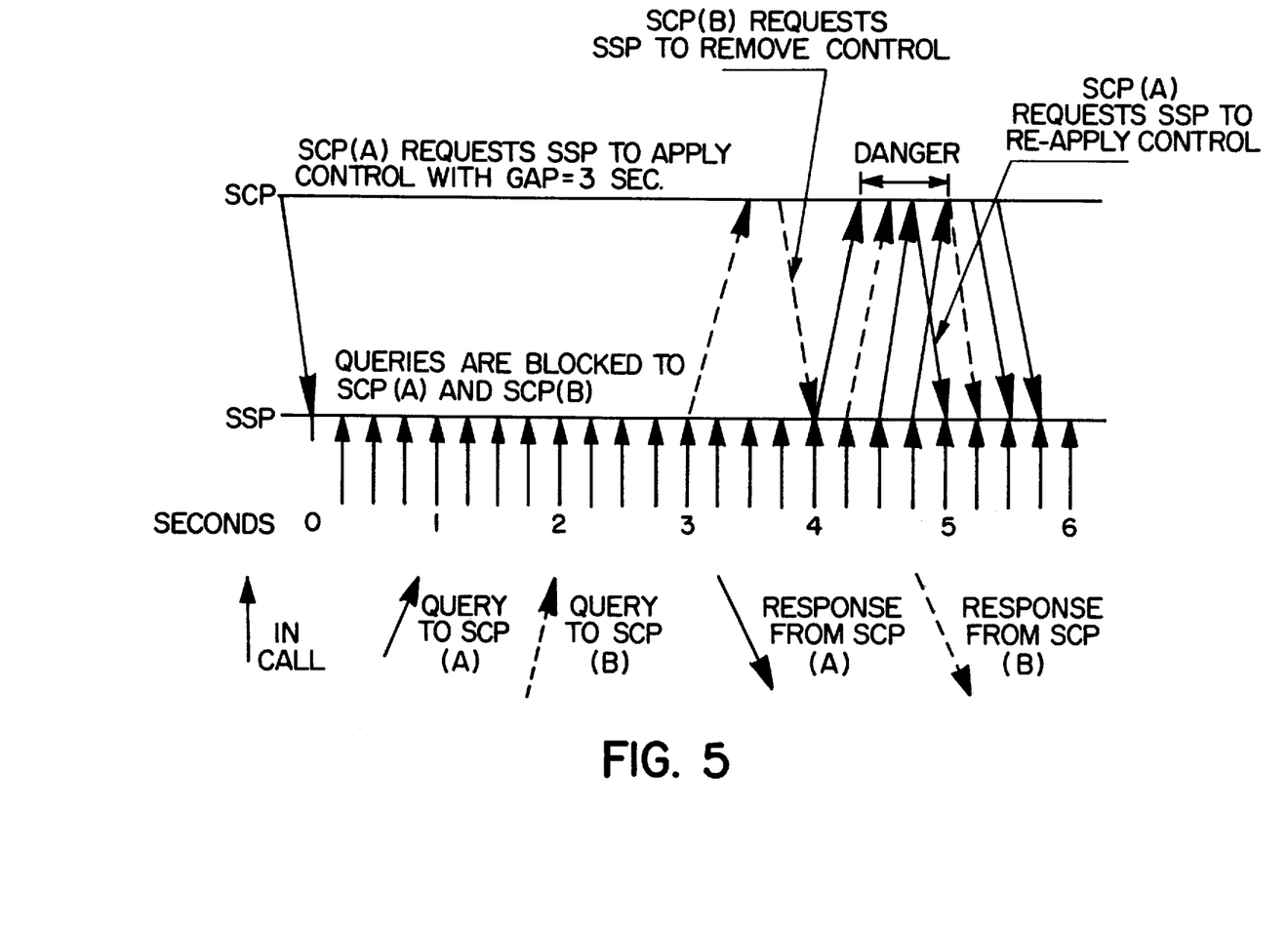
FIG. 5 is a timing graph illustrating an example of code gapping instability.

This problem further results in the instability of the controls. For two SCPs in the load sharing group, a control could be activated by one SCP and removed by the other constantly. The SCP under congestion will be processing queries not being blocked by the SSP and might get in severe overload state. This may happen, for example, in the period between the moment where the control is removed by SCP-B and the moment where a new control is activated by SSP, which is represented by the "Danger" zone in FIG. 5. This problem exists because the replicated SCPs do not communicate between each other to synchronize their active controls lists. One SCP does not know that another SCP requested a control for the common service SubSystem Number (SSN).

It is, therefore, desirable to resolve at least some of the identified load sharing SCPs traffic management control problems. A possible solution is presented in copending application Ser. No. (case No. MOHARRAM 3), wherein each SCP within the load sharing group of SCPs maintains control status information in relation to the entire group. Specifically, each SCP maintains respective controls lists for every SCPs of the group, and communicates any changes in its control status to the other SCPs via a communications link.

However, for multiple load sharing SCPs, communication links therebetween will produce a new overlaid network of SCPs. The number of controls lists on each SCP is proportional to the number of SCPs in the group. As the number of SCPs in load sharing SCP group increases, the number of controls lists on each SCP in the group increases accordingly. The SCPs messages exchanges and processing would significantly impact the SCPs real time processing capacity. Synchronization of the controls lists on the SCPs and SMS would also be complex and real time consuming. Therefore, for more than two SCPs, the communications link based solution may not be feasible.

An alternative solution especially suitable for a load sharing group of more than two SCPs (but may be used with only two SCPs) is desirable.

SUMMARY OF THE INVENTION

It is an object of the present invention to provide a new and improved mediation point for IN traffic management control of a load sharing group of service control points.

The invention, therefore, according to a first broad aspect provides in an intelligent telecommunications network having a plurality of service control points (SCPs) forming a load sharing group, a method for managing traffic consisting of queries to the load sharing group, comprising the steps of: maintaining respective controls lists for the plurality of SCPs, each controls list identifies controls which are active at the corresponding SCP; sending a query intended for the load sharing group to a mediation point (MP); and selecting, by the MP which has access to the respective controls lists, a particular SCP of the plurality of SCPs for which the controls list of the particular SCP does not identify a control relating to the query as being active; and sending, from the MP, the query to the particular SCP.

In accordance with a second broad aspect of the invention, there is provided a system for managing traffic consisting of queries to a load sharing group of service control points (SCPs) in an intelligent telecommunications network, comprising: a plurality of SCPs in the load sharing group; and a mediation point (MP) communicatively coupled to the plurality of SCPs, wherein the MP includes: respective controls lists for the plurality of SCPs, each controls list identifies controls which are active at the corresponding SCP; means for receiving a query intended for the load sharing group; means for selecting a particular SCP of the plurality of SCPs for which the controls list of the particular SCP does not identify a control relating to the query as being active; and means for sending the query to the particular SCP.

BRIEF DESCRIPTION OF THE DRAWINGS

The invention will be better understood from the following description of a preferred embodiment together with reference to the accompanying drawing, in which.

DETAILED DESCRIPTION

Figure 6:
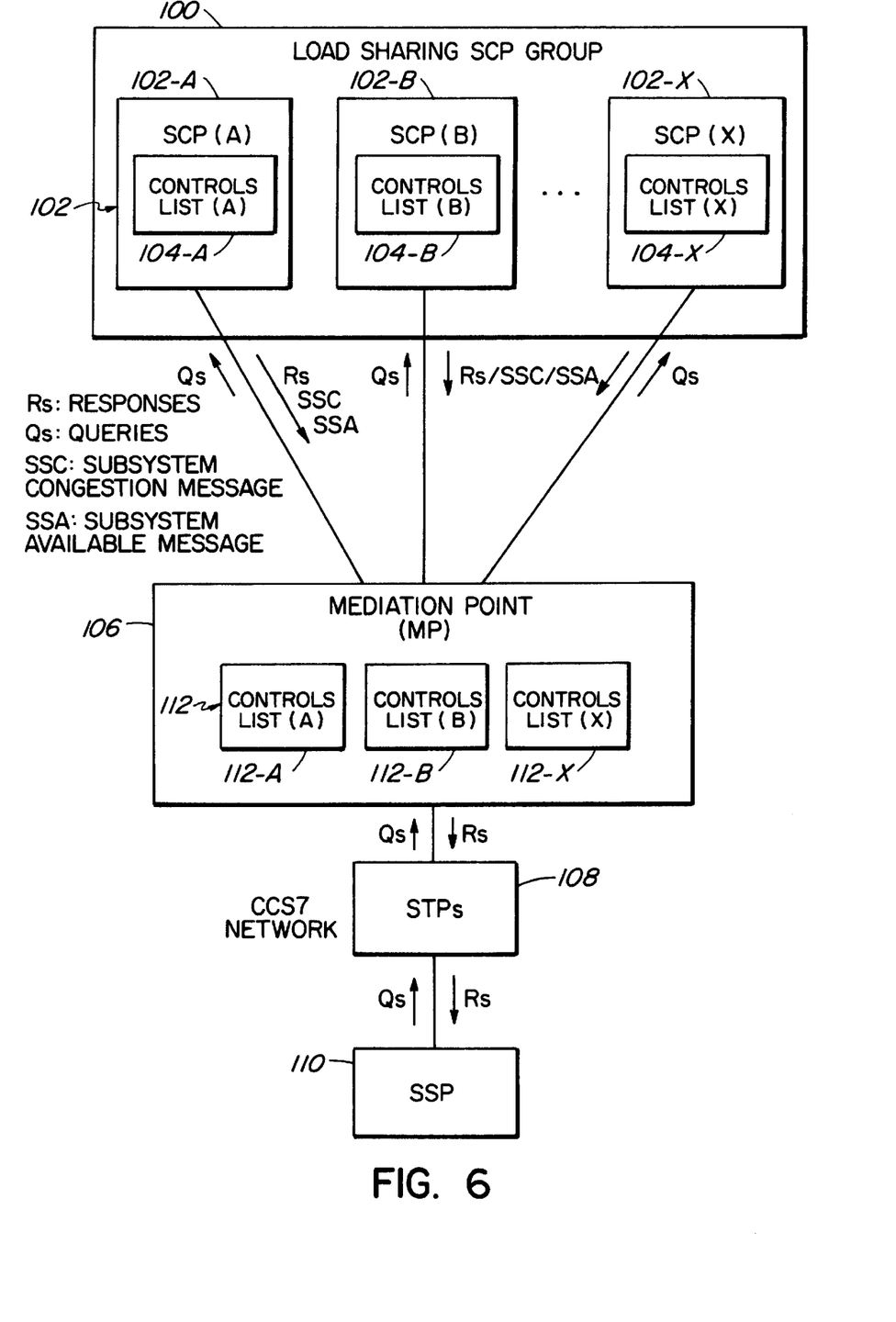
FIG. 6 is a schematic illustrating an embodiment of a load sharing SCP group and MP combination, in accordance with the present invention.

Referring to FIG. 6, shown is an embodiment of a load sharing SCP group 100 having three (but may include two or even more than three) SCPs 102, of which SCP 102-A and 102-B may be associated with a local service provider and SCP 102-X may be associated with a third party service provider. Each of the SCPs 102 maintains a controls list 104 which reflects its operational control state or status.

Through the CCS7 signalling network of the IN, a mediation point (MP) 106 communicatively couples the load sharing SCP group 100, via a service transfer point (STP) 108, to a (one or more) service switching point (SSP) 110. The MP 106 functions as a gateway to the local service provider SCPs 102-A and 102-B and the third party service provider SCP 102-X. Moreover, the MP 106 is responsible for maintaining and managing control status (or state) information in relation to the entire SCP load sharing group 100. The control state information, for instance, may be in the form of respective controls lists 112 for the individual SCPs 102 constituting part of the load sharing group 100. In the particular embodiment shown in FIG. 6, the MP 106 maintains three controls lists 112-A, 112-B and 112-X which reflect the controls list of SCPs 102-A, 102-B and 102-X, respectively. A copy of each of the controls lists 112 may also reside on the SMS (shown in FIG. 1), to synchronize the controls lists on the MP 106 and SCPs 102.

Although the functionality of the MP 106 and of the STP 108 are depicted using separate blockes in FIG. 6, it should be understood that these respective functions may be implemented on the same or separate platforms within an intelligent network.

In operation, when any SCP 102 in the group desires to request overload control for a new GTA/TT, for example say SCP 102-A, it sends a SubSystem Congestion (SSC) message indicating that control to the MP 106. Upon receipt of the SSC message, the MP 106 adds the indicated GTA/TT control to the controls list 112 corresponding to this specific SCP, namely the SCP-A controls list 112-A. When the MP 106 receives a new query including an overload control indicator from the SSP 110, the MP 106 attempts to correlate the active overload control to the particular SCP(s) 102 in the group 100, by matching the GTA/TT in the query to its corresponding control in the SCPs controls lists 112 and subsequently selects an SCP 102 from the group which is not overloaded. In this example, the MP 106 correlates the active overload control that matches the GTA/TT in the query to the SCP-A controls list 112-A and then may select either SCP 102-B or 102-X to which the query is forwarded.

When the selected SCP 102-B or 102-X receives the query, it processes the query and sends a response to the SSP 110. If the selected SCP 102-B or 102-X detects congestion subsequent to receipt of the query, it still processes the query and sends the response back to the SSP 110, but that SCP further sends a SSC message to the MP 106 informing it with its status, the MP adds the control to this SCP controls list.

When the MP 106 receives a new query message not having a control indication from the SSP 110, it may check if a control exists by attempting to match the GTA/TT of the query in all the SCPs controls lists 112. If no control exists, MP 106 then may route query to any SCP 102 in the group 100. If a control exists on a specific SCP 102, the MP 106 selects another SCP 102 for which that control is not active from the remaining SCPs in the group 100 and routes the query to it. If all SCPs 102 are overloaded, the MP 106 discards the query. The SSP 110 should then route the call to final treatment or default routing.

If the congestion level changes at one of the SCPs 102 in the group, for instance the congestion relating to an active control on SCP 102-A may decrease below a predetermined threshold, then SCP 102-A shall send a SubSystem Available (SSA) message to instruct the MP 106 to remove the control from its controls list. Upon receipt of this SSA message, the MP 106 removes the indicated control from the SCP-A controls list 112-A.

The follow provides a particular encoding format for the SubSystem Congestion (SSC) and SubSystem Available (SSA) messages. A SSC/SSA message exchange sequence between the SCPs and MP is also given. However, it should be understood that these specific operational parameters may be readily modified for adaptation to the requirements of the particular implementation.

Figure 7:
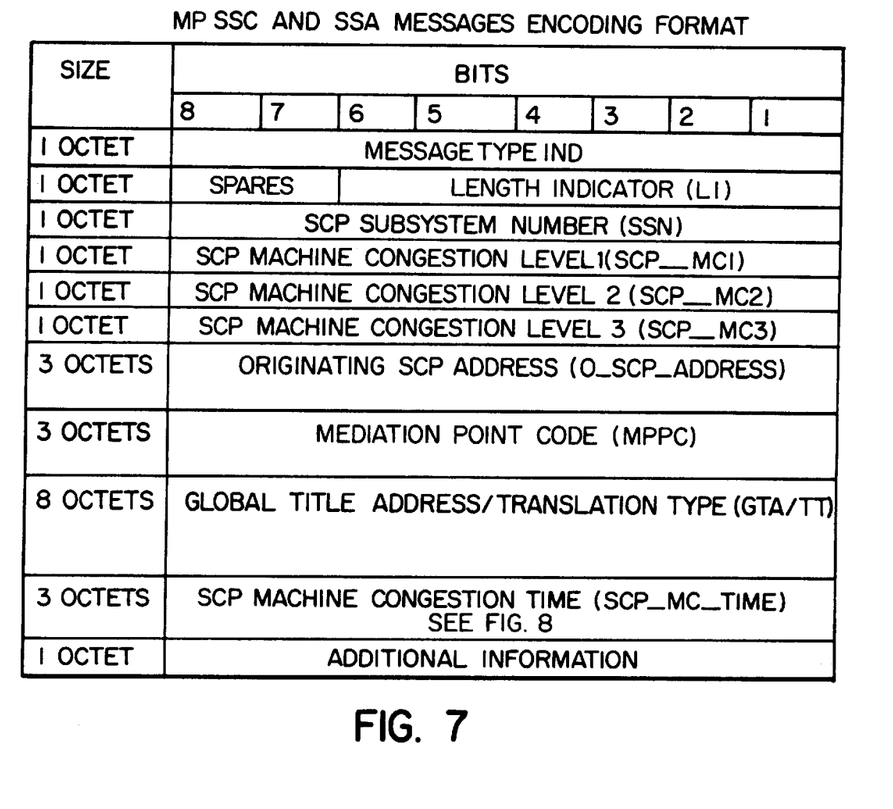
FIG. 7 is a structural representation of an encoding format common to both SubSystem Congestion (SSC) and SubSystem Available (SSA) messages.

FIG. 7 illustrates an exemplary encoding format common to both the SSC message and the SSA message. Each SSC and SSA message has a length of 24 Octets. The SSC and SSA messages include the following fields.

Message Type field: Parameter identifies the message type to be either SSA or SSC.

Length Indicator (LI) field: Parameter indicates the number of octets contained in the SSC or SSA message. Length is indicated as a binary number. A length indicator of value 0 (i.e., code "000000") designates a fill-in signal unit. If the information field of the message spans more than 62 octets, the length indicator is set to maximum value, namely 63 (code "111111").

SCP SubSystem Number (SSN) field: Parameter in this field identifies the IN process within the SCP. Several SSNs may identify respective IN processing within the SCP, (e.g., SSN=233 for Call Name Display service application). Each SSN is associated with a particular application processing on the SCP.

Machine Congestion Level 1 (MC1) field: Parameter identifies the first level of congestion on the SCP.

Machine Congestion Level 2 (MC2) field: Parameter identifies the second level of congestion on the SCP.

Machine Congestion Level 3 (MC3) field: This field identifies the third level of congestion on the SCP. If the SCP overload level reaches MC3. Overload above MC3 reflects a failure state for the SCP.

Originating SCP Address (O_SCP_Address) field: Parameter in this field indicates from which SCP the SSC or SSA message came. The O_SCP_Address field identifies the address of the SCP and it is 3 Octets in length.

Mediation Point Code (MPPC) field: Parameter in the MPPC field identifies the address of the MP and it is 3 Octects in length.

Global Title Address/Translation Type (GTA/TT) field: The GTA/TT parameter is converted at the Signaling Transfer Point (STP) to the SCP Point Code and SSN of the application running on the SCP. This field is 8 Octets and may be populated as defined for standard IN messages.

Figure 8:
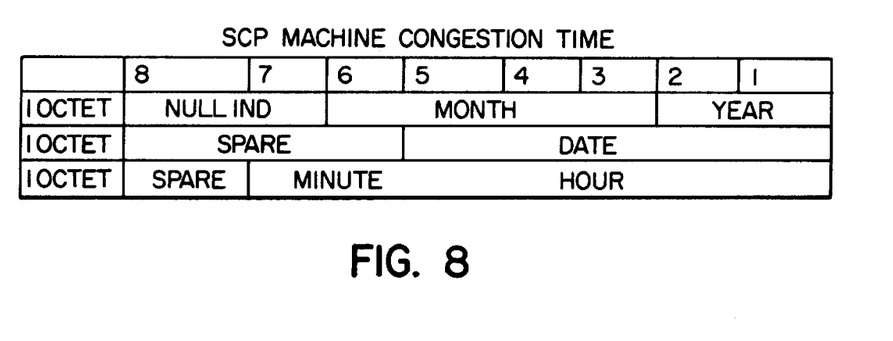
FIG. 8 is a structural representation of an encoding format for the machine congestion time field in the SSC and SSA messages.

SCP Congestion time (SCP_MC_Time) field: Depending on the context, the parameter in this field indicates either, in the SSC message, the time when the SCP is overloaded or, in the SSA message, the time when the overload level deceased. This field is 3 octets in length, for which an encoding is illustrated in FIG. 8 and described below.

Time Year field: In the first Octet of the SCP_MC_Time field, parameter may be encoded as follows:

| Bits 21 | Indication |
|---|---|
| 00 | Last year (value = 0) |
| 01 | Current year (value = 1) |
| 10 | Next year (value = 2) |
| 11 | Spare |

Time Month field: In the first Octet of the SCP_MC_Time field, parameter may be encoded as follows:

| Bits 6543 | Indication |
|---|---|
| 0000 | Spare |
| 0001 | January |
| 0010 | February |
| 0011 | March |
| 0100 | April |
| 0101 | May |
| 0110 | June |
| 0111 | July |
| 1000 | August |
| 1001 | September |
| 1010 | October |
| 1011 | November |
| 1100 | December |
| 1101 | Spare |

-continued

| Bits 6543 | Indication |
|---|---|
| 1110 | Spare |
| 1111 | Spare |

Time Null Indicator field: In the first Octet of the SCP_MC_Time field, parameter may be encoded as follows:

| Bits 87 | Indication |
|---|---|
| 00 | Null |
| 01 | Not Null |
| 10 | Reserved |
| 11 | Reserved |

Time Date field: In the second Octet of the SCP_MC_Time field, parameter may be encoded as follows:

| Bits 54321 | Indication |
|---|---|
| 00000 | Spare |
| 00001 | 1 |
| 00010 | 2 |
| 00011 | 3 |
| 00100 | 4 |
| 00101 | 5 |
| 00110 | 6 |
| 00111 | 7 |
| 01000 | 8 |
| 01001 | 9 |
| 01010 | 10 |
| 01011 | 11 |
| 01100 | 12 |
| 01101 | 13 |
| 01110 | 14 |
| 01111 | 15 |
| 10000 | 16 |
| 10001 | 17 |
| 10010 | 18 |
| 10011 | 19 |
| 10100 | 20 |
| 10101 | 21 |
| 10110 | 22 |
| 10111 | 23 |
| 11000 | 24 |
| 11001 | 25 |
| 11010 | 26 |
| 11011 | 27 |
| 11100 | 28 |
| 11101 | 29 |
| 11110 | 30 |
| 11111 | 31 |

Time Hour field: In the third Octet of the SCP_MC_Time field, parameter may be encoded as follows:

| Bits 54321 | Indication |
|---|---|
| 00000 | 0 |
| 00001 | 1 |
| 00010 | 2 |
| 00011 | 3 |
| 00100 | 4 |
| 00101 | 5 |
| 00110 | 6 |
| 00111 | 7 |
| 01000 | 8 |
| 01001 | 9 |
| 01010 | 10 |
| 01011 | 11 |
| 01100 | 12 |

-continued

| Bits 54321 | Indication |
|---|---|
| 01101 | 13 |
| 01110 | 14 |
| 01111 | 15 |
| 10000 | 16 |
| 10001 | 17 |
| 10010 | 18 |
| 10011 | 19 |
| 10100 | 20 |
| 10101 | 21 |
| 10110 | 22 |
| 10111 | 23 |
| 11000 | Spare |
| 11001 | Spare |
| 11010 | Spare |
| 11011 | Spare |
| 11100 | Spare |
| 11101 | Spare |
| 11110 | Spare |
| 11111 | Spare |

Time Minute field: Parameter in this field identifies the nearest quarter-hour. In the third Octet of the SCP_MC_Time field, the parameter may be encoded as follows:

| Bits 76 | Indication |
|---|---|
| 00 | 0 minutes |
| 01 | 15 minutes |
| 10 | 30 minutes |
| 11 | 45 minutes |

Figure 9:
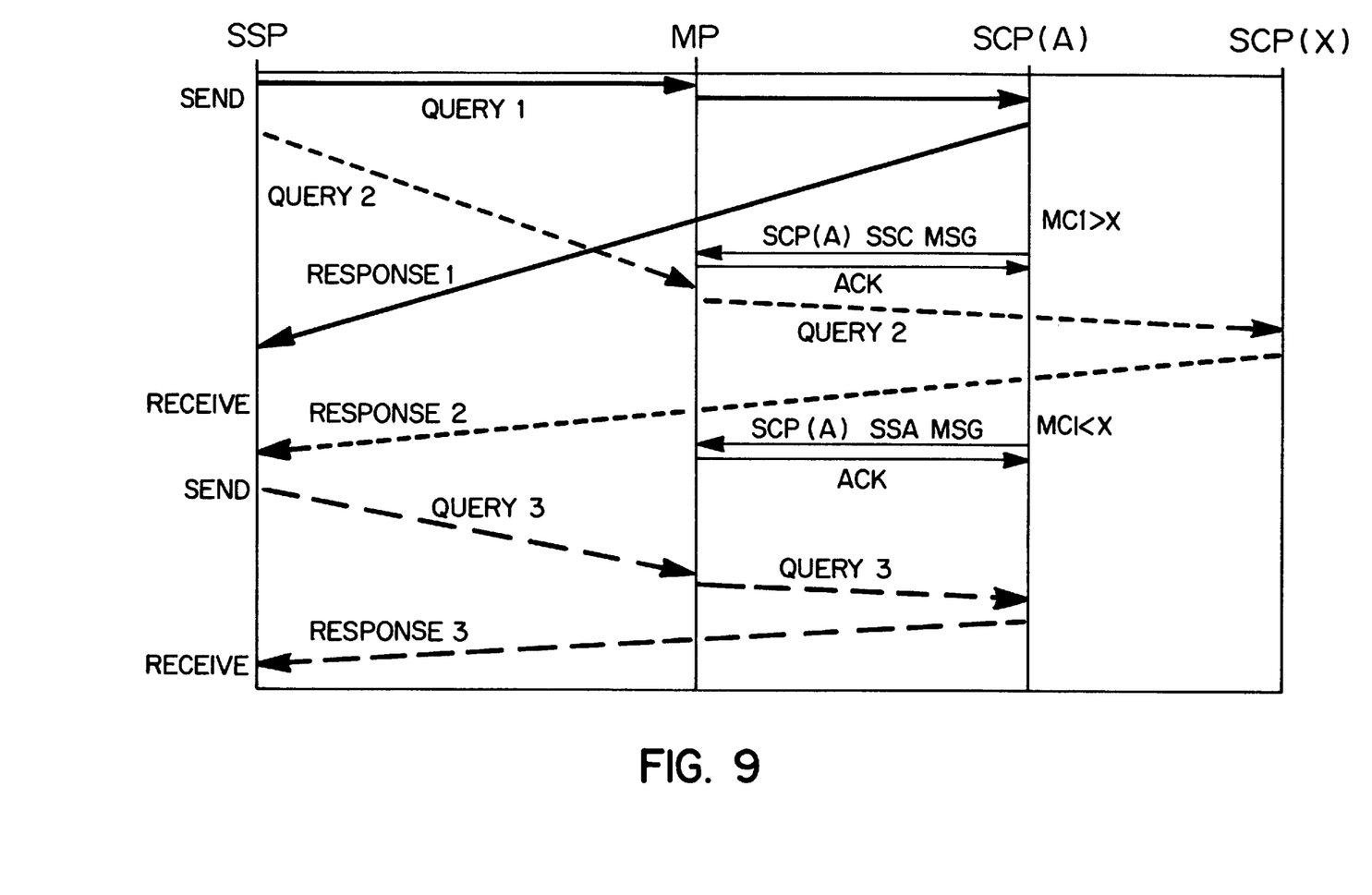
FIG. 9 is a timing graph illustrating message exchange between SCPs of a load sharing group, a MP and a SSP.

Turning now to FIG. 9, exemplified is the message flow between the SSP, MP and SCPs of the load sharing group. Queries may be generated as per [1] GR-1298-CORE, and the GTA/TT in such queries identifies the SCP for the service as is conventional. In accordance with the preferred implementation of the present invention, changes in the queries and messages exchanges between the SSP and load sharing SCP group are not necessary. The MP control feature does not impact the existing flow of messages in the Intelligent Network. Furthermore, the message exchange between the MP and SCPs will have no impact on the current network operations.

The role of the SSP as a participant in the message flow includes:

As a new IN call hits a trigger and requires the SSP to query the SCP, the SSP builds the query message as usual and sends it to the SCP via the Mediation Point (MP).

Upon reception of a control request message from SCP, the SSP applies the control to the GTA/TT identified by the SCP.

If the SSP does not receive a response from the load sharing SCP group and the SSP T1 Timer expires, it routes the IN call to final treatment or default routing.

The role of the MP as a participant in the message flow includes:

The MP receives the query message from the SSP and checks if a GTA/TT control applies for one of the SCPs connected to it. If there is no match to the GTA/TT control, it routes the message to its final destination identified in the query.

When the MP receives the query message with ACGEncountered control attached from the SSP, it adds the control (GTA/TT) to the SCP's corresponding controls list on the MP.

When the MP receives a new query message distend to the overloaded SCP, it checks if a control exists matching the query's GTA/TT in the SCP controls list. In the case where no control exists, the MP routes the query to the SCP. If a control exists, the MP routes the query to another SCP in the group.

In the case all SCPs are overloaded, the MP discards the query message.

Lastly, the role of the SCP as a participant in the message flow includes:

Upon receipt of a query, the SCP checks to see if congestion exists for the message's SSN. If there is no congestion for that specific SSN or no overall SCP congestion, the query is processed and the response is sent back to the SSP that originated the query.

If the SCP is reaching the congestion threshold setting, it processes the query and sends a request to the SSP to apply control to this specific GTA/TT.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

I claim:

1. In an intelligent telecommunications network having a plurality of service control points (SCPs) forming a load sharing group, a method for managing traffic consisting of queries to the load sharing group, comprising the steps of:

maintaining respective controls lists for the plurality of SCPs, each controls list identifies controls which are active at the corresponding SCP;

sending a query intended for the load sharing group to a mediation point (MP); and selecting, by the MP which has access to the respective controls lists, a particular SCP of the plurality of SCPs for which the controls list of the particular SCP does not identify a control relating to the query as being active; and sending, from the MP, the query to the particular SCP.

2. A method as claimed in claim 1, comprising discarding, responsive to an active control relating to the query being identified in each controls list, the query by the MP.

3. A method as claimed in claim 1, comprising the steps of:

generating a new control by any one SCP of the plurality of SCPs in the load sharing group;

sending, by the any one SCP, an add control signal which identifies the new control to the MP; and updating, by the MP, the controls list corresponding to the any one SCP to add the identified new control.

4. A method as claimed in claim 3, wherein the step of generating the new control includes receiving, by the any one SCP, the query which results in the any one SCP reaching a predetermined level of congestion.

5. A method as claimed in claim 4, comprising the steps of:

sending, by the any one SCP of the plurality of SCPs in the load sharing group, a remove control signal which identifies an existing control to the MP; and updating, by the MP, the controls list corresponding to the any one SCP to remove the identified existing control.

6. A method as claimed in claim 5, wherein individual controls in the controls lists are identified by a global title address and translation type, and each query includes respective indications for the global title address and the translation type.

7. A method as claimed in claim 6, wherein the any one SCP is overloaded when the predetermined congestion level which is associated with the global title address and the translation type indicated in the received query is reached; and the add control signal includes an identifier of the any one SCP, the global title address and the translation type.

8. A method as claimed in claim 7, wherein the add control signal indicates one or more levels of congestion on the any one SCP.

9. A system for managing traffic consisting of queries to a load sharing group of service control points (SCPs) in an intelligent telecommunications network, comprising:
   a plurality of SCPs in the load sharing group; and
   a mediation point (MP) communicatively coupled to the plurality of SCPs, wherein the MP includes:
      respective controls lists for the plurality of SCPs, each controls list identifies controls which are active at the corresponding SCP;
      means for receiving a query intended for the load sharing group;
      means for selecting a particular SCP of the plurality of SCPs for which the controls list of the particular SCP does not identify a control relating to the query as being active; and
      means for sending the query to the particular SCP.

10. A system as claimed in claim 9, wherein the MP includes means, responsive to an active control corresponding to the query being identified in each controls list, for discarding the query.

11. A system as claimed in claim 9, wherein each SCP of the plurality of SCPs includes means for generating a new control, and means for sending an add control signal which identifies the new control to the MP; and wherein the MP includes means for updating the controls list corresponding to the SCP from which the add control signal is received, to add the identified new control.

12. A system as claimed in claim 11, wherein the means for generating the new control, in each SCP, includes means for receiving the query which results in that SCP reaching a predetermined level of congestion.

13. A system as claimed in claim 12, wherein each SCP of the plurality of SCPs includes means for sending a remove control signal which identifies an existing control to the MP; and wherein the MP includes means for updating the controls list corresponding to the SCP from which the remove control signal is received, to remove the identified existing control.

14. A system as claimed in claim 13, wherein individual controls in the controls lists are identified by a global title address and translation type, and each query includes respective indications for the global title address and the translation type.

15. A system as claimed in claim 14, wherein any one SCP becomes overloaded when the predetermined congestion level which is associated with the global title address and the translation type indicated in the received query is reached; and the add control signal includes an address of the any one SCP, the global title address and the translation type.

16. A system as claimed in claim 15, wherein the add control signal indicates one or more levels of congestion on the any one SCP.

* * * * *